United States Patent

[11] 3,532,076

[72] Inventors Willis D. Parker
144 Emerson St., Palo Alto, 94301;
Norman V. Lyons, 3092 Calzar Drive, San Jose, California 95118
[21] Appl. No. 710,430
[22] Filed Feb. 16, 1968
[45] Patented Oct. 6, 1970

[54] ANIMAL WATERING DEVICE
6 Claims, 5 Drawing Figs.
[52] U.S. Cl. ............................................. 119/81
[51] Int. Cl. ....................................... A01k 07/00
[50] Field of Search .............................. 119/81; 137/408, 451

[56] References Cited
UNITED STATES PATENTS
3,333,575 8/1967 Spencer.................. 119/81X Primary Examiner—Hugh R. Chamblee
Attorney—Gregg and Hendricson ABSTRACT: An animal watering device comprising a housing having a pair of spaced side walls formed with opposed slots into which pivot members extending from opposite sides of a water receptacle are removably engaged. Resilient biasing means between the housing and pivot members normally resiliently bias the water receptacle into pivotal engagement in said slots. A resilient water supply tube having one end adapted for connection to a source of water and the other end disposed above the receptacle is attached to the housing, which tube is formed with a reverse bend for control of water flow therethrough. The tube adjacent the bend is attached to the pivotally mounted receptacle for actuation of the tube between tube closed and tube open positions. Consequently, the water flow through the tube is controlled in accordance with the weight of water in said receptacle. When the receptacle is removed from the housing, the resilient biasing means actuates the tube to a tube closed condition to shutoff the flow of water therethrough.

Patented Oct. 6, 1970

3,532,076

INVENTORS
WILLIS D. PARKER
NORMAN V. LYONS

BY *Tregg & Stisham*
ATTORNEYS

INVENTORS
WILLIS D. PARKER
NORMAN V. LYONS

BY *Gregg & Stidham*
ATTORNEYS

ANIMAL WATERING DEVICE

DESCRIPTION

This invention relates to an animal watering device and more particularly to a watering device which maintains a predetermined amount of water in a water receptacle in accordance with the weight thereof.

Animal watering devices which function automatically to maintain a predetermined water level in a receptacle are well known. Some such devices include a valve in the water flow line, which valve is actuated through a connection to a movably mounted receptacle into which the water flows and from which the animal drinks. Such watering devices are of relatively complicated construction and expensive, and the valves included therein often malfunction. Other such devices include a resilient inlet tube and a tube pinching mechanism under control of the water level in a receptacle for closing off the tube when the receptacle is sufficiently full of water. It has been found, however, that simple pinching of the supply tube does not afford adequate control of the water flow therethrough.

An object of this invention is the provision of an animal watering device in which the flow of water through a flexible tube from a source of water to a water receptacle is easily and readily automatically controlled for positive control of the water flow therethrough.

An object of this invention is the provision of an automatic animal watering device which is of simple design, inexpensive, and readily maintained and repaired.

An object of this invention is the provision of an automatic animal watering device of the type whereby siphoning of the water from the drinking receptacle back to the water supply is prevented thereby preventing contamination of the water source.

An object of this invention is the provision of an automatic animal watering device which includes a removable water receptacle and novel means for automatically cutting off the water supply from the water source when the receptacle is removed from the device.

An object of this invention is the provision of an animal watering device with a readily adjustable means for adjustment for differences in water supply pressure.

An object of this invention is the provision of a simplified animal water device in which spring biasing means serve the dual function of supporting a water receptacle in the device, and also shuts off the water from the water supply when said water receptacle is removed from the device.

The above and other objects and advantages of the invention are achieved by an animal watering device comprising a housing having a pair of spaced side walls formed with opposed slots therein. A water receptacle having aligned outwardly extending pivot members adjacent one end thereof is pivotally attached to the housing by engagement of the pivot members in the housing slots. Resilient biasing means normally urge the pivot means on the receptacle into pivotal engagement with the slots. A resilient water supply tube is attached to the housing for support of one end of the tube above the pivotal water receptacle. The other end of the tube is adapted for connection to a water supply source such as a water reservoir. The water supply tube is formed with a reverse bend therein, the curvature of which reverse bend is under control of the pivotal water receptacle for movement between tube closed and tube open positions. When the water receptacle is removed from the device, as for cleaning or the like, the resilient biasing means urges the tube into tube closed condition.

The invention and other objects and advantages thereof will be better understood from the following description when read in conjunction with the attached drawings. In the drawings, wherein like reference characters refer to the same parts in the several views.

Figure 1:
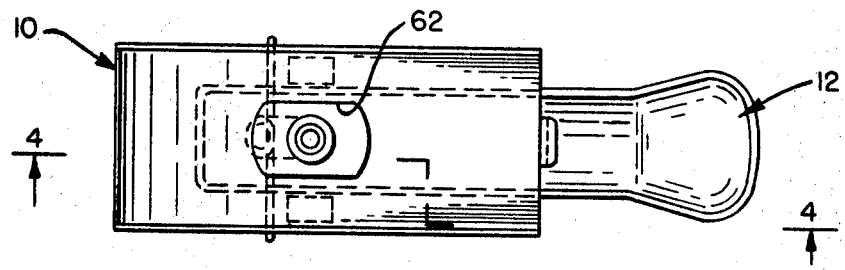
FIG. 1 is a top plan view of a novel animal watering device embodying this invention.

Reference is now made to the drawings wherein the novel automatic animal watering device of this invention is shown comprising a housing 10 with a pivotally mounted liquid receptacle 12 extending therefrom. The housing 10 comprises a pair of spaced side walls 14A and 14B, one of which comprises a mirror image form of the other. As viewed in FIGS. 2, 4 and 5, the side walls are generally circular-shaped but include a forwardly extending portion formed with a flat forward edge 16. The side walls are interconnected by any suitable means such as a generally cylindrical-shaped body 18 which is formed with an opening 20 adjacent the forward end thereof to accommodate the water receptacle 12. The housing may be formed of any suitable material such as metal, plastic, or the like. In practice a molded plastic housing which is formed in two sections has been found to be satisfactory and economical. Each housing section may include one of the side walls and a portion of the cylindrical body 18 intergrally formed therein, which body portions are then secured together by any suitable means.

Figure 2:
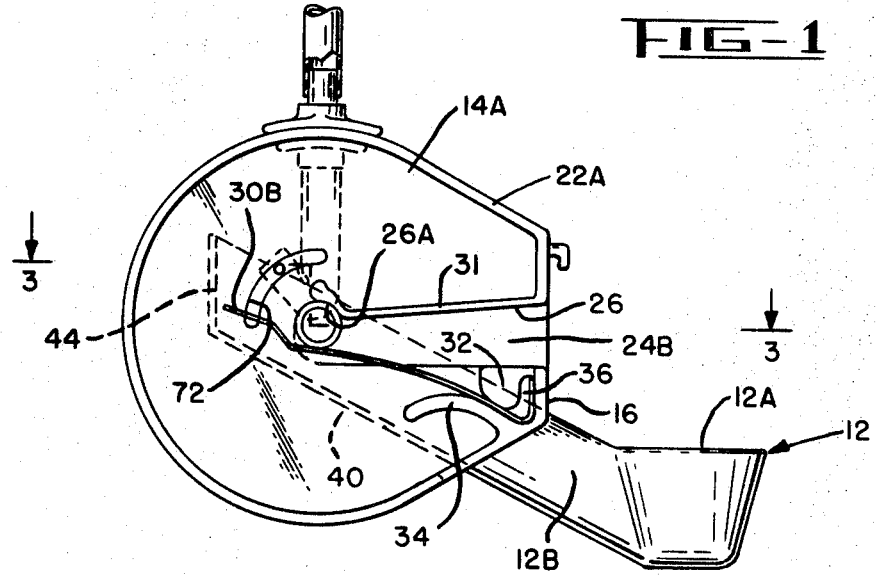
FIG. 2 is a side elevational view of the device shown in FIG. 1 but showing the same with the outer cover removed therefrom.

The body side walls 14A and 14B are provided with integral outwardly directed flanges 22A and 22B, respectively, extending about the periphery thereof. Cover plates 24A and 24B are attached to the flanges as by cement, screws, or other suitable means, not shown. In Fig. 2 the device is shown with the cover plate 24A removed therefrom to better illustrate the same. The side walls 14A and 14B are formed with opposed elongated slots 26 which extend from the body opening 20. The slots are generally horizontally oriented and are formed with upwardly extending indentations 26A at the inner ends thereof to accommodate bearing members 28 carried by the water receptacle 12 and described in greater detail below. For present purposes, it will be noted that the bearing members 28 are urged upwardly into the indentations 26A by resilient biasing means 30 when the water receptacle is fully inserted in the housing 10. A reinforcing rib 31 is provided on each of the walls 14A and 14B along the upper edge of the slots to strengthen the walls thereat and to provide bearing surfaces for the bearing members 28 as the water receptacle is being inserted and removed from the slot.

In the illustrated arrangement the biasing means 30 comprise leaf springs having one end attached to the side walls 14A and 14B by spring mounting means which may include spaced protuberances 32 and 34 formed on the outer face of the sidewalls 14A and 14B between which one end of the leaf springs extend. The captive ends of the springs 30 are formed with upturned portions 30A which are positioned in a cavity 36 (FIGS. 2, 4 and 5) formed between said protuberances and the flanges 22A and 22B. The springs are maintained in position between the protuberances by the covers 24A and 24B.

The water receptacle 12 is shown comprising an elongated trough portion 12B with a cup member 12A formed at the outer free end thereof. The trough comprises a bottom member 40, spaced side walls 42, and end wall 44 opposite the cup portion 12A. Headed shafts 46 extend from opposite sides of the trough portions upon which shafts the bearing members 28 are rotatably mounted. The water receptacle 12 is attached to the housing 10 by inserting the same into the wall opening 20 with the bearings 28 in the slots 26. The bearing members 28 are engaged by the leaf springs 30 which urge the same into the recessed ends 26A of the slots when the water receptacle is fully inserted. In the assembled condition the water receptacle is pivotally movable about the axis of the shafts 46. The water receptacle is easily removed for cleaning, or the like, by simply pulling the same outwardly from the housing.

Figure 4:
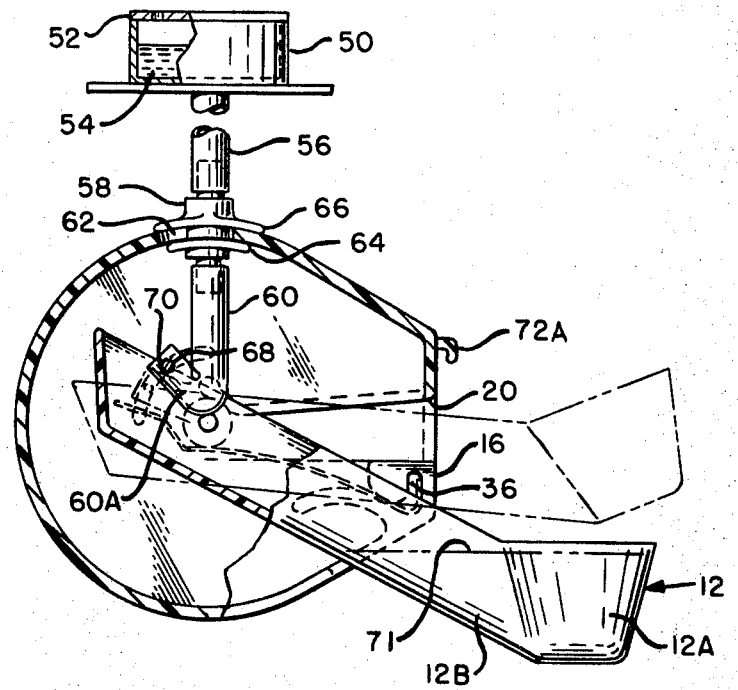
FIG. 4 is a vertical sectional view taken substantially along line 4-4 of FIG. 1, and includes also a showing of a water reservoir.

Liquid, such as water, is supplied to the receptacle 12 from any suitable source such as a reservoir 50 shown in FIG. 4. The illustrated reservoir is provided with a vented cover 52 to permit the water 54 to drain by gravity force through a supply tube 56. The reservoir may be positioned at any convenient location above the novel watering device.

The supply tube 56 connects through a movable coupling 58 to an outlet hose 60. The coupling 58 extends through an elongated aperture 62 formed in the body 18 adjacent the upper end thereof, and has flanges 64 and 66 formed thereon which snugly, but movably engage the inner and outer surfaces of the body 18 adjacent the slot 62. The coupling thereby is adjustably positioned along said slot for adjustment of the angular position of the outlet hose 60 about the pivot-axis of the water receptable 12 for reasons which will become apparent hereinbelow.

In accordance with one feature of this invention the outlet hose 60, which is made of resilient material such as rubber, plastic, or the like, is provided with a reverse bend, or crimped section, 60A therein adjacent the lower end 60B for control of the flow of water therethrough. With the water receptacle 12 positioned in the housing, the discharge end 60B is disposed above the upper end of the trough portion of the water receptacle whereby water issuing from the hose 60 drops into the inclined trough from whence it flows into the cup portion 12A. With an air gap between the discharge end of the hose 60 and the water in the receptacle 12, siphoning of water from the receptacle back into the water supply is prevented under any condition. With this antisiphon arrangement, back flow and possible contamination of the water supply is not possible from the output portion of this system.

The angle of the reverse bend, or crimp, 60A is controlled between tube closed and tube open conditions illustrated by the full and broken line positions, respectively of the tube shown in FIG. 4. A pin 68, which extends diametrically through the tube 60 adjacent the discharge end 60B, engages notches 70 in the trough side walls 42 when the receptacle 12 is in position in the housing. In the illustrated crimped condition, the tube 60 tends to return to a normal straight or inline position, and consequently, exerts a torque on the water receptacle in the counterclockwise direction as viewed in FIGS. 2 and 4. When the water receptacle 12 is empty it is pivoted into the broken line position illustrated in FIG. 4, and the angle of bend of the crimped end 60A of the hose 60 is reduced to permit the liquid 54 to flow therethrough. The liquid drops into the trough portion 12B to begin filling the cup portion 12A. As the cup fills with liquid the receptacle is pivoted in the clockwise direction as viewed in FIGS. 2 and 4. When the cup is filled, say to the level designated 71 in FIG. 4, the tube 60 is crimped sufficiently to cut off the flow of water through the tube.

A hook 72A is formed on the flat face 16 of the body for hooking the device onto a wire cage, not shown. The device fastens to the outside of the cage and an aperture is formed in the cage wall through which the pivotal water receptacle extends. The device is readily unhooked from the cage and the water removed from the housing for cleaning or changing, when desired.

Figure 3:
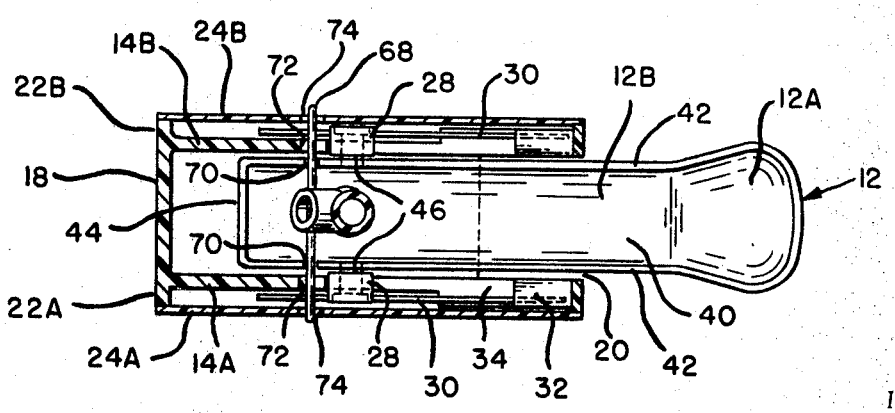
FIG. 3 is longitudinal sectional view taken substantially along line 3-3 of FIG. 2.
Figure 5:
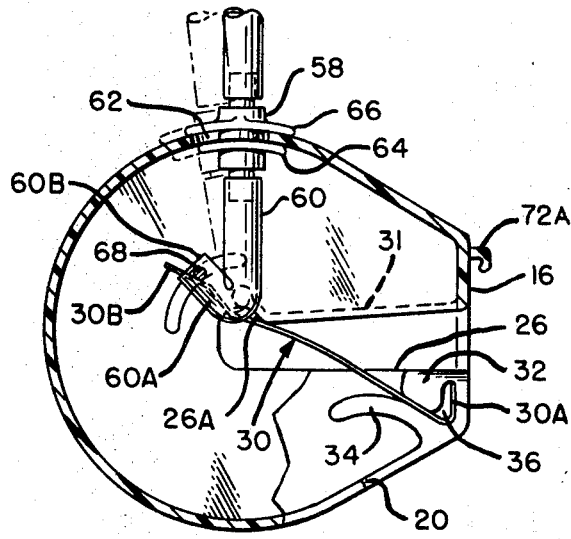
FIG. 5 is a view which is similar to that of FIG. 4 but showing the pivotal water receptacle removed from the device.

The hose actuating pin 68 extends outwardly through arcuate slots 72 in the side walls of the device and, if desired, the covers 24A and 24B may be provided with aligned arcuate slots 74 (see FIG. 3) through which the outer ends of the pin extend. When the water receptacle 12 is removed from the housing, as illustrated in FIG. 5, the extended ends 30B of the springs 30 engage the pin 68 to urge the hose into a tightly crimped condition to cutoff the flow of liquid therethrough. The pin 68 is guided along the arcuate slots 72 and 74 when the water receptacle 12 is removed. It will be seen, therefore, that the springs 30 serve the dual function of maintaining the water receptacle in pivotal position in the housing, and of crimping the tube 60 to cutoff the flow of water when the water receptacle is removed.

The torque produced by the crimped hose 60 on the pivotal receptacle depends, among other things, on the composition and resiliency of the hose 60 and the water pressure in the hose. To adjust for such variations, the coupling 58 is adjustably positioned along the slot 62 in the housing for pivotal movement of the hose 60 about the axis of rotation of the pivotally mounted receptacle. Closing torque provided by the receptacle 12, and by the springs 30 when the receptacle 12 is removed, is increased by rotating the hose in a counterclockwise direction to the illustrated broken line position of FIG. 5.

Although a single preferred embodiment of the invention is shown for purposes of illustration, it will be understood that various changes and modifications may be made therein without departing from the spirit and scope of the invention as defined in the appended claims.

I claim:

1. An animal watering device comprising:
   a housing;
   a water receptacle removably attached to the housing;
   a resilient water supply tube having one end adapted for connection to a water source and the other end disposed for supply of water to the receptacle;
   said tube having a reverse bend section movable between tube closed and tube open positions;
   means connecting the removable water receptacle to said tube for movement of said reverse bend section between closed and open conditions for control of water flow through the tube in accordance with the amount of water in said receptacle; and
   resilient biasing means for actuating the tube to a tube closed condition upon removal of the receptacle from the housing.

2. The watering device as defined in claim 1 wherein said resilient biasing means resiliently biases the receptacle into movable position with the housing when the receptacle is movably attached to said housing.

3. An animal watering device comprising:
   a housing formed with a pair of spaced side walls;
   said side walls being formed with opposed slots therein;
   a water receptacle with pivots extending from opposite sides thereof and pivotally engageable in the slots in the housing side walls;
   resilient biasing means attached to the housing and normally resiliently biasing the receptacle pivots into pivotal engagement in said slots in the housing side walls;
   a resilient tube attached to the housing and having one end adapted for connection to a water source and the other end disposed for discharge into the receptacle;
   said tube having a reverse bend therein;
   means connecting the pivotal water receptacle to the tube adjacent the reverse bend for control of the bend between water flow and water cutoff conditions; and
   said resilient biasing means engaging said last-mentioned connecting means for movement of the tube reverse bend to the water cutoff condition upon removal of the receptacle from the housing.

4. An animal watering device comprising:
   a housing;
   a water receptacle supported on said housing for movement between an up position toward which the receptacle is urged when empty and a down position toward which the receptacle is urged when filled with water;
   water supply means including a valve and a first valve operating means which operates to automatically open the valve when the water receptacle is in its up position to thereby deliver water to the receptacle and which operates to automatically close the valve when the receptacle is in its down position to thereby shut off the supply of water; and
   a second valve operating means operable to close the valve automatically when the receptacle is removed, said second valve operating means being inoperable when the receptacle is in operating position in the housing and is in its up position.

5. An animal watering device comprising:

a housing;

a water receptacle supported on the housing for movement between an up position toward which the receptacle is urged when empty and a down position toward which the receptacle is urged when filled with water;

water supply means including a flexible tube having a reverse bend portion which functions to deliver water from a source to the receptacle when the bend is moved toward straight position and to shut off delivery of water when the bend is moved toward bent position; and mounting means for said flexible tube including the flexible bend portion thereof, such mounting means being adjustable to adjust the degree of bending of the tube.

6. An animal watering device comprising:

a housing;

a water receptacle supported by said housing for movement between an up position toward which the receptacle is urged when empty and a down position toward which the receptacle is urged when filled with water;

water supply means including a flexible tube having a reverse bend portion which functions to deliver water from a source to the receptacle when the bend is moved toward straight position and to shut off delivery of water when the bend is moved toward bent position;

mounting means for said flexible tube including the flexible bend portion thereof, such mounting means being adjustable to adjust the degree of bending of the tube;

a first valve operating means actuated by movement of said receptacle between up and down positions whereby the flexible tube is moved toward straight position when the receptacle is moved toward its up position and the flexible tube is moved toward bent position when the receptacle is moved to its down position; and second valve operating means operable to move the flexible tube to bent position and thereby shut off the flow of water when the receptacle is removed, such second valve operating means being inoperable when the receptacle is mounted in the housing and is in its up position.